(12) United States Patent
Morrison

(10) Patent No.: US 7,226,061 B2
(45) Date of Patent: Jun. 5, 2007

(54) DISPOSABLE SHIPPING CART FOR LIVE PLANTS

(75) Inventor: John Mark Morrison, Homestead, FL (US)

(73) Assignee: Kerry's Bromeliad Nursery, Inc., Homestead, FL (US)

( * ) Notice: Subject to any disclaimer, the term of this patent is extended or adjusted under 35 U.S.C. 154(b) by 325 days.

(21) Appl. No.: 10/979,135

(22) Filed: Nov. 3, 2004

(65) Prior Publication Data

US 2006/0091631 A1    May 4, 2006

(51) Int. Cl.
*B62B 1/00* (2006.01)
(52) U.S. Cl. .................................... 280/79.3
(58) Field of Classification Search ............... 108/59, 108/189; 206/423; 211/126.1, 132.1, 134, 211/153; 229/163
See application file for complete search history.

(56) References Cited

U.S. PATENT DOCUMENTS

| | | | |
|---|---|---|---|
| 3,379,304 A * | 4/1968 | Mertz ...................... 206/600 |
| 4,725,066 A | 2/1988 | Nootenboom et al. | |
| 4,941,572 A * | 7/1990 | Harris ...................... 206/423 |
| 4,998,023 A * | 3/1991 | Kitts ....................... 280/47.35 |
| 5,718,441 A | 2/1998 | Kern et al. | |
| 5,875,904 A | 3/1999 | Burgess | |
| 6,213,483 B1 * | 4/2001 | Gaffney ................... 280/47.35 |
| 6,244,194 B1 * | 6/2001 | Salmanson et al. ......... 108/55.1 |
| 6,641,032 B1 * | 11/2003 | Schilling ................... 229/174 |
| 2003/0160409 A1 | 8/2003 | Hanson et al. | |

* cited by examiner

Primary Examiner—Christopher P. Ellis
Assistant Examiner—Katy E. Meyer
(74) Attorney, Agent, or Firm—Lawrence E. Laubscher, Sr.; Lawrence E. Laubscher, Jr.

(57) ABSTRACT

A disposable shipping cart for live plants includes a rigid frame mounted on casters for rolling transport, which frame is formed from an inexpensive non-metallic material and includes a plurality of vertically spaced shelf supports upon which are fastened cardboard shelves that are fastened to the frame. Preferably, each shelf is folded from a cardboard blank having side and end walls that are foldable to vertical positions in which the end portions thereof are arranged for fastening to the corner posts of the frame, respectively.

9 Claims, 2 Drawing Sheets

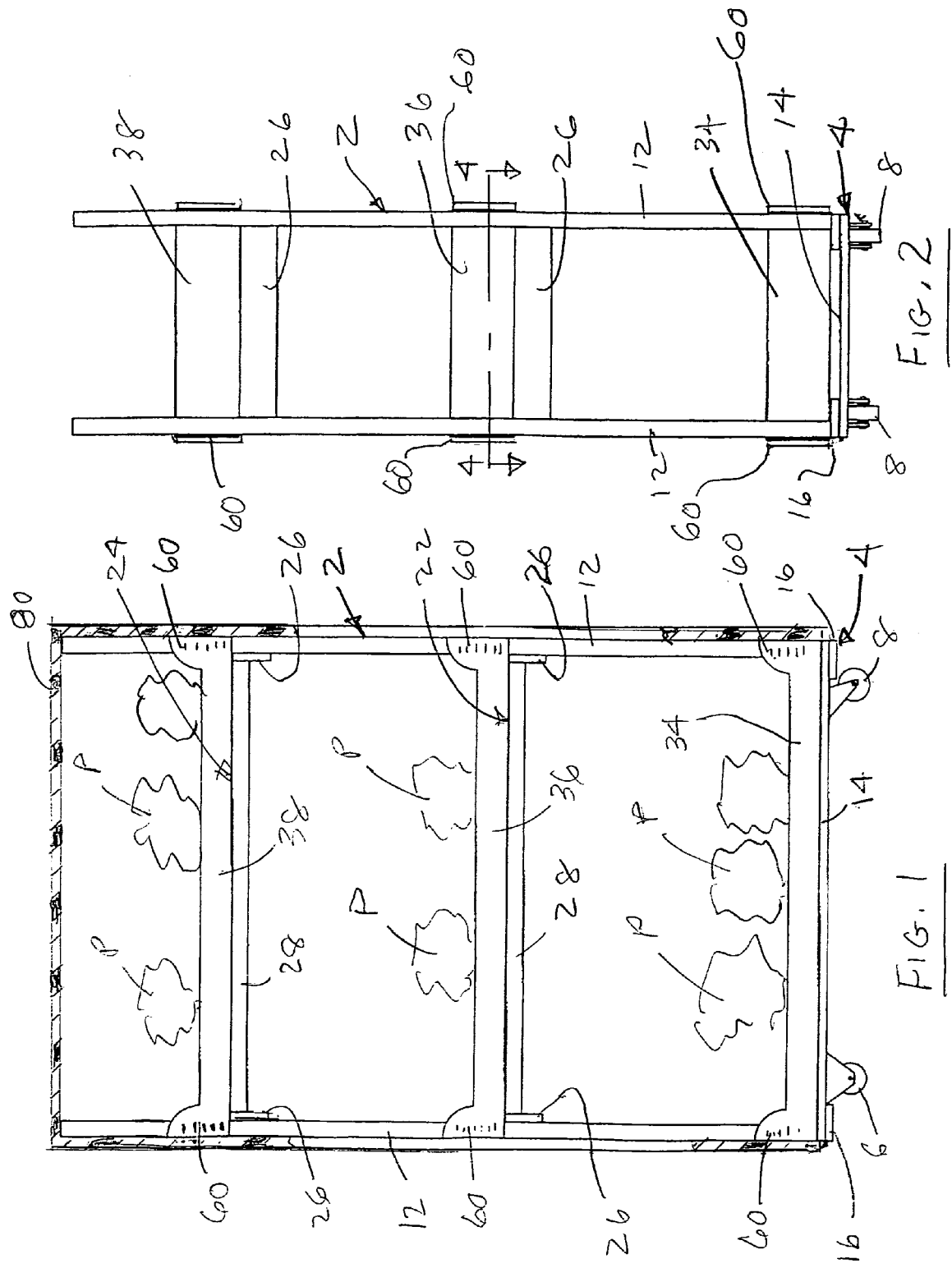

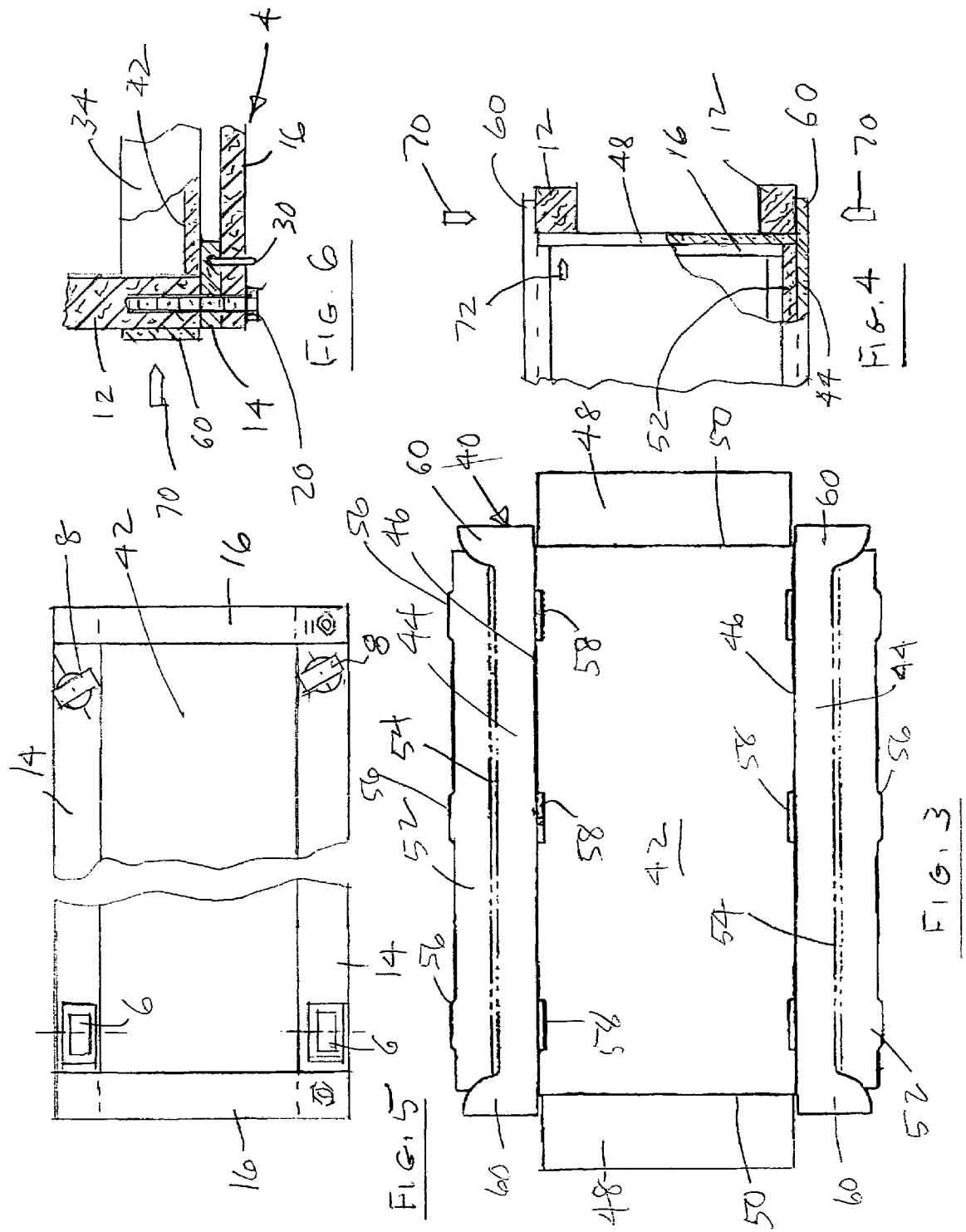

DISPOSABLE SHIPPING CART FOR LIVE PLANTS

BACKGROUND OF THE INVENTION

1. Field of the Invention

A disposable shipping cart for live plants includes a frame supported by casters for rolling transport, which frame is formed from an inexpensive non-metallic material, such as wood, and includes shelve support means that support a plurality of vertically spaced open-topped cardboard shelves that receive the live plants.

2. Description of the Related Art

Wheeled carts for transporting flowers or plants are well known in the patented prior art, as shown by the patents to Nootenboom U.S. Pat. No. 4,725,066, Kern et al. U.S. Pat. No. 5,718,441, Vorstenbosch U.S. Pat. No. 5,875,904, and Burgess U.S. Pat. No. 6,135,299, together with the published Hansen et al. application No. U.S. 2003/0160409 A1.

The use of cardboard and other inexpensive disposable material in shipping containers for plants and flowers is known in the art. In the patent to Mertz U.S. Pat. No. 3,379,304, for example, the use of cardboard is proposed, which cardboard is stapled to the wooden sidewalls of the flaps. Note also the patents to Mertz U.S. Pat. No. 3,656,611 and Fulton U.S. Pat. No. 5,041,149.

In the plant nursery industry, there is a constant desire to reduce labor costs related to shipping, merchandising, and receiving live plants. Previously, the industry standard for shipping live plants has been the simple cardboard box. The problems associated with this style of packaging are as follows.

Over the years, the pack quantities per box have been reduced. For instance, a 6" pot, previously a standard pack 12, is now pack 6 per box. This was done to conform to Produce Marketing Association pack quantities, and also so an individual could easily handle the weight of the package. This change doubled the cost of packaging. It also increased the waste associated with shipping.

Boxes reduce airflow around the plants. This is not a problem if the shipping and receiving locations are climate-controlled. Most are not, which creates an ever present potential for heat damage to the plants.

Applicant has determined through its store delivery program that the volume of its products sold at retail dramatically increases when it has an opportunity to be involved in the merchandising of its products When its products are shipping in a box, quite often it is dependent on store personnel to unpack in a timely manner, handle and display its products. Customers have proven to be very conscious of increased labor costs. When shipping a box, staff is required to be on hand to unpack and display the plants, thereby resulting in a decrease of profitability.

Accordingly, Applicant has determined that there was a need in the art for an inexpensive disposable portable cart for packaging, transporting, and displaying live plants.

BRIEF SUMMARY OF THE INVENTION

Accordingly, a primary object of the present invention is to provide a shipping cart for live plants including a frame supported by casters for rolling transport, said frame being formed from a disposable non-metallic material such as wood or a synthetic plastic material, and including a plurality of vertically spaced shelf supports that support open-topped shelves formed from cardboard. The vertical side and end walls of the cardboard shelves are fastened to vertical corner posts of the frame, thereby to define a disposable assembly for transporting plants to a customer for immediate on-site merchandising display and marketing.

According to a more specific object of the invention, each shelf is formed from a cardboard blank having fold lines defining bottom, side, and end walls. The side walls include at each end fastening wing portions that are stapled to the external surfaces of the corner posts of the frame. The end portions of the end walls of the shelves are stapled to inner surfaces of the corner posts. Reinforcing flaps are provided on the side walls of the shelves, the reinforcing flaps being foldable downwardly against the inner surfaces of the side walls and having stabilizing tabs that extend into slots provided in the bottom wall.

According to another object of the invention, after the live plants have been placed on the shelf by the plant producer, the shipping cart is enclosed by a shrink-wrap protective coating, thereby to permit shipping of the cart and its contents as a self-contained protected unit. Preferably, the cardboard is impregnated with wax, thereby to increase the durability and life of the disposable shipping cart.

BRIEF DESCRIPTION OF THE DRAWINGS

Other objects and advantages of the invention will become apparent from a study of the following specification when viewed in the light of the accompanying drawings, in which:

FIG. 1 is a side elevational view of the shipping cart for live plants, according to the present invention;

FIG. 2 is an end elevational view of the apparatus of FIG. 1;

FIG. 3 is a top plan view of the cardboard blank from which the shelves of the shipping cart are formed;

FIG. 4 is a sectional view taken along line 4—4 of FIG. 2;

FIG. 5 is a bottom view of the shipping cart; and

FIG. 6 is a detailed view of the lower corner section of the frame.

DETAILED DESCRIPTION OF THE INVENTION

Referring first more particularly to FIGS. 1 and 2, the shipping cart of the present invention includes a rigid frame 2 including a rectangular base 4 in the form of a pallet, which base is supported for rolling transport by a pair of fixed casters 6 and a pair of steerable casters 8. The frame includes four vertical corner posts 12 that extend upwardly from the corners of the base 4. As shown in FIG. 5, the base includes a pair of longitudinal base members 14 and a pair of transverse base members 16. As best shown in FIG. 6, each vertical corner post 12 is rigidly connected with the base 4 by a vertical bolt 20. In accordance with an important feature of the invention, a plurality of shelf support means 22 and 24 are defined in vertically spaced relation above the base 4 of the frame. More particularly, each shelf support means is defined by pairs of transverse and longitudinal shelf support members 26 and 28, the ends of which are secured by nails to the corner posts 12, respectively. Preferably, all of the components of the frame are formed from an inexpensive disposable material, such as wood or a synthetic plastic material. The components are secured together by conventional nails 30 (FIG. 6) or other fasteners, such as screws or the like.

In accordance with the present invention, a plurality of open-topped cardboard shelves 34, 36, and 38 are mounted on the base 4 and on the shelf supports 22 and 24, respectively. As will be described in greater detail below, each of the open-top shelves is formed from a folded cardboard blank 40, as shown in FIG. 3. More particularly, the cardboard blank 40 includes a bottom wall 42, a pair of side walls 44 connected with the bottom wall by fold lines 46, and a pair of end walls 48 connected with the bottom wall by fold lines 50. The side walls 44 are provided with reinforcement flaps 52 that are connected with the side walls by fold lines 54. As will be explained in greater detail below, the reinforcing flaps 52 are provided with stabilizing tabs 56 that are adapted to extend within corresponding locking slots 58 contained in the bottom wall 42.

At each end, the side walls 44 are provided with wing portions 60. These wing portions 60 are arranged to be secured to the external surfaces of the corner posts 12 by fasteners, such as staples 70 (FIGS. 4 and 6). The end walls 48 are adapted to be fastened to the inner surfaces of the corner posts 12 by staple 72, as shown in FIG. 4.

In order to form the shelves from the cardboard blank 42, the side walls 44 are folded upwardly to the vertical position relative to the base wall 42, and the reinforcing flaps are folded inwardly and downwardly in contiguous engagement with the inner surfaces of the stabilizing tabs 56 to extend in locking engagements with the locking slots 58. The end walls 48 are then folded about fold line 50 to the vertical position. The folded open-topped shelf is then mounted in place, whereupon the mounting flaps 60 on the side walls 44 are fastened by staples 70 to the outer surfaces of the corner posts, as shown in FIGS. 4 and 6. The end walls 48 are then stapled to the inner surfaces of the corner posts 12 by the staple 72, as shown in FIG. 4. A plurality of plants P are then placed upon the cardboard shelves 34, 36, and 38 for transport to the customer. An external layer of shrink wrap 80 is placed about the shipping cart to protectively enclose the assembly of cardboard shelves and the plants during transport. Preferably, the cardboard is impregnated with wax, thereby to increase its shipping life and resistance to water. The shipping cart and plant package is transported to the customer, whereupon the shrink wrap outer layer 80 is removed, and the plants P are exposed for display and direct sale to the customers. After the sale of the plants has been completed, the carts are simply disassembled and disposed of in an inexpensive manner.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A disposable shipping cart for live plants and the like, comprising:
    (a) a frame including:
        (1) a horizontal rectangular base having four corners and a given longitudinal axis;
        (2) four vertical spaced corner posts having lower ends secured to and extending upwardly from the corners of said base;
        (3) first shelf support means arranged in vertically spaced relation at a first elevation above said platform, said shelf support means including:
            (a) a first pair of parallel longitudinal shelf supports extending between and having end portions fastened to said corner posts, respectively; and
            (b) a second pair of parallel transverse shelf supports extending between and having end portions fastened to said corner posts, respectively;
        (4) said base, said corner posts, and said shelf supports being formed from an inexpensive disposable non-metallic material;
    (b) caster means supporting said base for rolling transport;
    (c) a first open-topped shelf mounted on said first shelf support means, said first shelf being formed from a folded cardboard blank, including:
        (1) a rectangular horizontal bottom wall having side and end edges;
        (2) opposed pairs of side and end walls connected by fold lines with said bottom wall side and end edges, respectively;
        (3) said side walls having at each end a mounting wing portion so arranged that when said side walls are folded upwardly to the vertical position relative to said base wall and said shelf is mounted on said shelf support means, said mounting wing portion extends in contiguous engagement with the exterior surface of the adjacent corner post; and
    (d) fastener means securing said mounting wing portions to said vertical posts.

2. A disposable shipping cart for live plants as defined in claim 1, and further including a further cardboard shelf mounted on said base, and means fastening said further cardboard shelf to said vertical posts.

3. A disposable shipping cart for live plants as defined in claim 2, wherein said frame further includes:
    (5) means defining a plurality of further shelf support means arranged in vertically spaced relation above said first shelf support means;
and further including:
    (e) a plurality of further cardboard shelves mounted on said further shelf support means, respectively; and
    (f) means fastening said further cardboard shelves to said vertical posts.

4. A disposable shipping cart for live plants as defined in claim 3, wherein the vertical spacing distance between said shelf support means is such as to permit live plants to be placed on said shelves; and further including:
    (g) a layer of shrink wrap synthetic plastic material enclosing said frame.

5. A disposable shipping cart for live plants as defined in claim 1, wherein said base comprises a pallet formed from longitudinal and transverse members; and further including a plurality of vertical bolt means fastening said corner posts to the corners of said pallet, respectively.

6. A disposable shipping cart for live plants as defined in claim 1, wherein said cardboard blank further includes:
    (5) a pair of reinforcing flaps connected with said side walls by fold lines parallel with said bottom wall side edges, said reinforcing flaps being foldable downwardly toward vertical positions contiguous with the inner surfaces of said side walls when said side walls are in their vertical fastened position, said reinforcing flaps having at their free edges a plurality of stabilizing tabs that extend downwardly into corresponding stabilizing slots contained in said bottom wall.

7. A disposable shipping cart as defined in claim 1, wherein said end walls are foldable upwardly to vertical positions in which the end portions thereof are in engagement with the inner surfaces of the adjacent corner posts, respectively, said fastener means being operable to secure the end portions of said end walls to said corner posts, respectively.

8. A disposable shipping cart as defined in claim 1. wherein said base, said corner posts, and said shelf supports are formed from wood.

9. A disposable shipping cart as defined in claim 1, wherein said base, said corner posts, and said shelf supports are formed from a synthetic plastic material.

* * * * *